United States Patent Office 3,325,428
Patented June 13, 1967

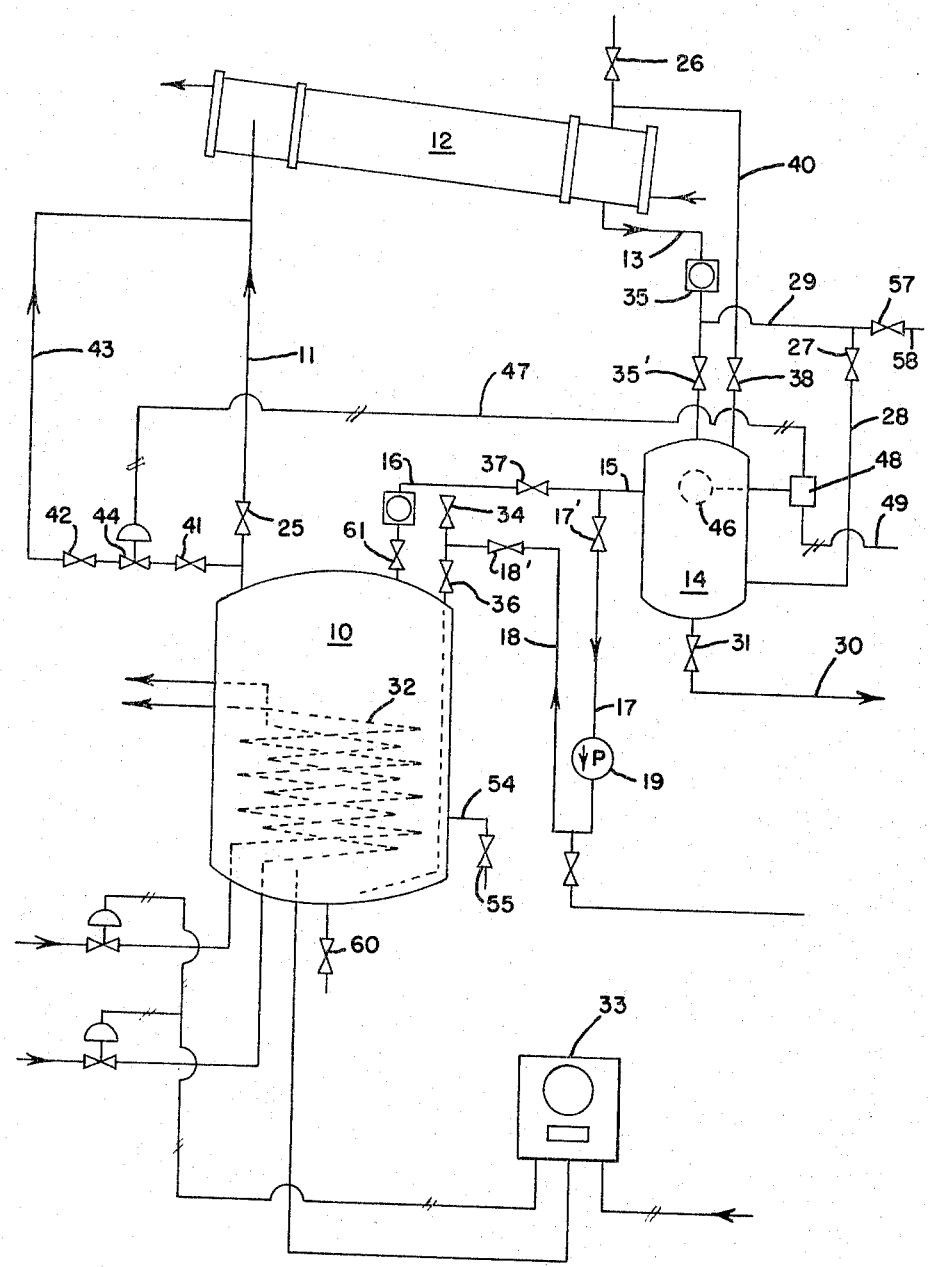

3,325,428
METHOD OF PREPARING IMPROVED POLYESTERS AND ALKYDS, AND PRODUCTS THEREOF
Richard B. Graver, Savage, and Newton D. Farel, Minneapolis, Minn., assignors to Archer-Daniels-Midland Company, Minneapolis, Minn., a corporation of Delaware
Filed Aug. 25, 1966, Ser. No. 575,049
Claims priority, application Canada, Dec. 29, 1960, 813,911
15 Claims. (Cl. 260—22)

This application is a continuation-in-part of our copending application, Ser. No. 1,249, filed Jan. 8, 1960, now abandoned.

This invention relates to methods and apparatus for preparing improved polyester resins including alkyds and the products derived therefrom. More particularly, this invention is concerned with improved coating and laminating non-gelled polyester resin products including alkyds, modified alkyds, and the like, having, among other improvements, better flow, increased hardness, toughness, chemical resistance, durability, and improved curing time and in which the molecular weight distribution is believed to be relatively uniform with extremely high and extremely low molecular weight constituents not present in objectionable amounts, and to apparatus and methods of producing such products.

The invention is likewise directed to improved methods of preparing the aforesaid polyester and alkyd resin products in an environment ab initio. The invention also relates to improved methods of converting polyester and alkyd resins to products having improved properties by processing them in a large amount of inert solvent with or without reduction of A.V. (acid value). For purposes of nomenclature, the term "polyester resin" as used herein is intended to include alkyd resins, modified alkyd resins and polyester resins. The terms "polyester resin" and "alkyd resin" may be interchangeably used and neither term is exclusive of the other for purposes of identification.

Conventional polyester resins are known to contain considerable portions of low molecular polymers in addition to polymers of higher molecular weight. The low molecular weight polymers contribute to the "tackiness" of films during the curing cycle, and detract from the durability, hardness, toughness, chemical resistance, and other properties of the films. It has been postulated that if these low molecular weight fractions could be removed, resin films would air dry faster, since no low molecular weight material would be present to cause tackiness, and the hardness, toughness, chemical resistance and durability would be improved. If the low molecular weight portions are removed, baked films cure faster and are harder, tougher, more durable, and more chemical resistant.

Conventional polyester resins also contain a portion of very high molecular weight polymers which contribute to high viscosity, incompatibility, poor gloss, poor pigment wetting, poor flow, etc., due to the complex nature of the polymer structure. If such very high molecular weight fractions are eliminated, then polyester resins with lower viscosity, improved compatibility, gloss, pigment wetting, flow, etc., are obtained.

It has been suggested that if both the low molecular weight fraction and the high molecular weight fraction could be eliminated from a polyester resin, without effecting gelation during the processing, the following improvements could be expected: faster cure (air dry or bake), harder films, tougher films, more resistant films, more durable films, lower viscosity resins, more compatible resins, higher gloss, improved flow, improved pigmen wetting, and other advantages.

Fractionation of alkyd resins is unsatisfacotry since good fractionation techniques for polyester and alkyd resins are unavailable and, in any event, the use of fractionation as a means for polyester and alkyd improvemen is an uneconomic procedure. To the extent fractionatior studies have been made, it is suggested that the lowel molecular weight fractions, of around or under 200C molecular weight, are watery and thin, and will dry poorly, remain tacky, and the very high molecular weight fractions of around 10,000 molecular wieght are gelatinous, cannot be cut with solvents, and contribute to high viscosity, incompatibility, poor gloss, poor flow, poor pigment wetting, etc.

It is an object of this invention to provide a solution esterification process and apparatus for preparing improved polyester resins, including alkyd resins, and to the resultant products.

It is another object of the invention to provide an improved solution esterification process and apparatus for preparing polyester resins, including alkyd resins, wherein the resins are prepared ab initio or converted under heat and pressure in the presence of solvent present in a critical amount and which solvent is inert in respect to the resins and capable of dissolving the resins so prepared or converted in the solvent, and to the resultant products.

It is another object of this invention to provide a system for additional processing of non-gelled polyester resin solutions prepared by conventional means, which additional processing uses heat and pressure and modifies and improves such resin solutions without gelation or causing any substantial increase in esterification, or decrease of acid value.

An additional object of this invention is to provide improved non-gelled polyester resins, including alkyd resins, having improved flow and curing properties and to provide films and laminates having improved drying time, alkali and solvent resistance, and improved hardness without loss of adhesion and flexibility.

It is a further object of the invention to provide improved apparatus and processes for preparing polyester resins, including alkyd resins, wherein gelation of the resin is inhibited during resin formation at acid values and under cooking conditions wherein such gelation would normally occur, and to the resultant products.

Other and further objects are those inherent in the invention herein illustrated, described and claimed.

To the accomplishment of the foregoing and related ends, this invention then comprises the features hereinafter set forth and more fully described and particularly pointed out by certain illustrative embodiments which are indicative of the ways in which the accomplishment of the improved polyester resins, including alkyd resins, of this invention are obtained. The following description of the embodiments exemplifying the process for providing the improved polyester resins of this invention is to be taken in conjunction with the accompanying drawing which schematically illustrates the preferred system utilizing reflux with the reactor chamber under pressure, the condenser under normal pressure and the return of the solvent to the reactor at a fairly constant rate in order to maintain the desired amount of solvent at all times in the reaction system during the reaction process.

According to this invention the polyester resin is either formed or reconstructed in a critical amount of selective solvent which keeps the so-formed resin dissolved but does not enter into the reaction. The reaction for forming the resin can be carried out ab initio in the critical and required amount of solvent, or the resin can be partially formed or prepared in a non-gelled state and then further acted by treatment with a critical amount of solvent for improvement.

In this invention, it has been found that the amount and operties of a solvent suitable for use in the preparation the improved products are:

(1) The solvent must be present in a critical amount about 30% to about 70% by weight of the total charge icluding the solvent) and have sufficient solvency power keep the polyester resin in solution during the process d as a final product.

(2) The solvent must be inert in respect to the reaction nstituents under conditions of reaction.

(3) The solvent should have a boiling range up to out 400° F. and preferably is the same solvent that is ed to thin the resultant product in its commercial application.

(4) The inert liquid organic solvent must have low lubility for water to facilitate removal of water of reaction.

Solvents having a boiling range no higher than about 00° F. are used for most coating applications. If higher oiling solvents are used, they must be removed and relaced with a lower boiling solvent since the higher boiling solvents inhibit the cure of the alkyd resin films under ormal drying conditions. In this respect, it has been ound that the higher boiling solvents are difficult if not npossible to remove from the alkyd resin for substitution f additional solvent. One of the difficulties encountered that the resin oftentimes gels during the solvent removal r the resinous composition contains gel particles which annot be filtered out and which destroys the continuity f applied films. Thus, it will be recognized that the alkyd esins cannot be in a gel state at any time prior to application as a coating vehicle.

According to this invention, a variety of processes have een developed embodying the solution esterification technique, particularly for providing the improved alkyd of his invention. These are generally classified as follows:

*Procedure 1.*—The polyester resin is prepared, ab nitio, in the solvent.

Under such conditions, the polyester constituents, for xample, the fatty acid, polyol, and polybasic acids, are harged into the reaction vessel along with a critical solent level so that the percent solvent is always present n amounts from about 30% to about 70% of the total harge including solvent, with about 40% to about 65% eing preferred for a higher level of efficiency. The polyster esterification reaction may be carried out under eflux conditions with a suitable means for removing the vater, at about 400–500° F. with about 450–490° F. eing preferred. In utilizing a solvent meeting the above onditions, a pressure-azeotrope system must be used. The preferred pressure form of apparatus for this purpose s shown in the drawing and will be described later. Of course, reflux is not always necessary to cause the polyster conversion to proceed, but reflux causes the reaction to go faster and it is preferred that reflux conditions be used during processing, with the percentage of solvent remaining substantially constant in the reaction zone. When water is formed during the esterification reaction, some means for its removal must be provided. According to this mode of proceeding, the resin is processed to final specifications of acid value and viscosity under the conditions above mentioned. After the final acid value specifications have been reached, the resin is cooled and adjusted to the desired percent solids in the desired solvent which is preferably the same solvent that is used in the solution esterification.

Various forms of pressure azeotrope apparatus may be used. In one apparatus the autoclave or reaction vessel (which is equipped with a suitable agitator), the condenser and decanter (water separation unit), are all connected together and sealed to prevent leakage of vapors to the atmosphere. Under these conditions, water and solvent escaping from the reaction mixture are condensed in the condenser and flow into the decanter where the water separates out and the solvent is returned to the reaction mixture by gravity or by the aid of a circulating pump. Thus, in such apparatus the reaction proceeds essentially the same as a conventional solvent reflux or fusion cook at atmospheric pressure except that the reaction system is closed and the pressure is elevated.

In the preferred system, which is the one illustrated, only the reactor is under pressure. During processing, a mixture of solvent and water vapor is continuously bled off through a throttle valve and condensed in a condenser and separated in a decanter. A suitable pump then returns the liquid solvent to the reaction mixture. This pump must return the solvent against the pressure in the reactor and therefore must be designed to pump against the pressure developed in the reactor. By means of suitable control mechanisms, the pump and throttle valve can be adjusted so that the same amount of solvent is returned to the reactor as is removed through the throttle valve. This apparatus is the preferred.

If the percent solvent used during processing is higher than desired in the final resin solution, a portion of the solvent may be removed from the solution either by vacuum, at atmospheric pressure, or by flashing off while the resin solution is at the temperature of the esterification reaction. On the other hand, additional solvent may be added to the resin solution to make a final resin solution lower in solids content than during the processing step. The solvent may be added by any suitable and safe means. Thus, the final resin solids of the solution product may be obtained by any suitable means for adjusting the solids content.

*Procedure 2.*—Alcoholysis of the triglyceride constituent of the resin, as a preliminary to the polyesterification reaction.

In this procedure, the triglyceride oil constituent of the polyester resin, such as soya oil, linseed oil, safflower oil, etc., and a desired natural or synthetic polyol, are reacted in the presence of a proper catalyst to about 450–500° F. to effect alcoholysis. After the alcoholysis reaction is complete, as determined by the usual technique, the balance of the polyester formulation charge, plus the inert solvent for the solution esterification, is added and the balance of the polyester resinification is carried out as described above.

*Procedure 3.*—A procedure in which the reaction for forming the polyester resin is partially carried out conventionally but not beyond a point at which gelation occurs.

According to this procedure, and in order to speed up the reaction times, it has been discovered that the inert solvent for the solution esterification does not have to be added to the initial reaction mixture of the non-gelled polyester resin formulation. It has been found that the major portion of the esterification of the polyester formulation may be carried out under conventional conditions, the inert solvent being added after the polyester resinification reaction has proceeded partly or nearly to completion without gelation according to the usual modes of procedure, and the balance of the reaction is then carried out in the critical level of solvent environment.

According to this invention, it has been found that, for the most part, the polyester resins which are prepared by Procedure 1 above, and the same polyester compositions prepared by Procedures 2 and 3 above, are nearly the same. The color, cure speed, durability, chemical resistance, etc. are essentially the same for a resin made by any procedure, but viscosity may vary to some degree.

*Procedure 4.*—Solution modification of polyester resins.

A modified procedure of preparing non-gelled polyester resins of prescribed constituency and characteristics is by heating finished polyester resins in an inert solvent in the amount and of the type herein specified. This changes one or more of the characteristics of the finished resin and thereby improves its range of commercial uses. Thus, finished and commercially usable polyester resins, according to this invention, are diluted with a solvent of the kind and amount aforesaid and heated in a sealed reactor under pressure and thereafter cooled and filtered. This effects a lowering of viscosity without any substantial change in acid value. In addition, the flow and cure properties are improved after the formulation of standard enamels therefrom.

*Solvents.*—According to this invention, exemplary solvents which may be used with good results are coating solvents having a boiling range of about 150° F. to 420° F., such as VM & P naphtha, mineral spirits, white spirits, high flash naphtha, trichloroethylene, naphthenes, etc. Other useful solvents which may be used with good results are aromatic solvents, such as xylene, toluene, benzene, and chlorobenzene, and various petroleum solvents containing a high degree of aromatic compounds, such as the commercially available Solvesso 150 and Solvesso 100 and the like which are conventionally used in coatings. These inert liquid organic solvents are aliphatic, cycloaliphatic and aromatic hydrocarbons and chlorinated aliphatic and aromatic hydrocarbons known in the coating and laminating art.

Generally, as the solvent in the solution esterification process, it is preferable to use high solvency power, inert solvents, such as xylene, for short and short-medium oil modified alkyd resin formulation (30–50% oil fatty acids), and to use aliphatic solvents, such as mineral spirits and VM & P naphtha, for alkyd resin formulations containing 50% or more oil fatty acids. Of course, there is some overlapping as to where xylene and mineral spirits are used, and by suggestion of a preferred solvent, it is not intended that others will not provide benefits of the invention.

It has been discovered that the amount of inert solvent has a relationship to the final viscosity of the resin which is produced. As set forth in detail in the examples, the viscosity of the final resin increases as the amount of inert solvent decreases between the limits of about 30% to about 70% (of total material present in the reaction zone). However, within these limits the final properties of the resin films do not change appreciably. If less than about 30% solvent is present in the reaction zone, little benefit is obvious, whereas if more than 70% solvent is used, no particular increase in benefits is noted. Thus, a critical amount of about 30% to about 70% solvent should be used in the process for obtaining the non-gelled products herein described and contemplated.

If a solvent in the boiling range herein specified is used, it may be desirable to remove all the solvent after the reaction is complete and replace it with another solvent (thinner). This solvent may be removed by vacuum distillation at a low temperature without affecting the resin, and the second solvent (thinner) then added. If higher boiling solvents are used, small gel particles often form and are difficult to remove. It is, therefore, not the purpose of the herein described process to provide a breakdown of gelled particles dispersed in a solvent but a single phase polyester resin in solution, as distinguished from dispersing or blending ingredients per se. Consequently, while somewhat higher boiling solvents may be used in the process, with strict care to avoid formation of the insoluble gel particles, they are not of the preferred character herein exemplified.

Any of the polyols normally used in polyester and alkyd formations may be used. These include glycerol, pentaerythritol, dipentaerythritol, trimethylolethane, trimethylolpropane, sorbitol, ethylene glycol, propylene glycol, etc. In a preferred aspect of this invention, in order to readily obtain the aforementioned non-gelled low acid value product, it is essential that the polyol used or charged should be present in a stoichiometric excess of at least 9%, based on the total number of hydroxyl groups (or equivalents) in the polyhydric alcohol and the total number of carboxy groups (or equivalents) present in the acids used in the formulation. Using a formulation that has at least 9% excess polyol will result in an alkyd (or polyester) which has some residual hydroxyl groups. For some applications of such alkyds, it is desirable to have more residual hydroxyl groups than in others. For example, where the alkyd is to be cured with melamine-formaldehyde resins, it may be desirable to formulate with 15 to 30% excess polyol in order to be sure that the alkyd has sufficient hydroxyl cross-linking sites. As another example, if one desires to formulate the resin for maximum solubility in an aliphatic solvent, e.g., mineral spirits then it is generally desirable to formulate with a 10–15% excess polyol, since greater amounts of polyol would result in poor solubility of the resin in the aliphatic solvent. In any case, the upper limit of polyol used will not exceed 45 weight percent, based on the total weight of resin-forming ingredients, regardless of the number of hydroxyl groups in the particular polyol used. Generally, the amount of polyol used will be 15 to 45 weight percent, based on the total weight of resin-forming ingredients.

Any of the usual dibasic acids or anhydrides may be used such as phthalic anhydride, isophthalic anhydride, maleic anhydride, fumaric acid, adipic acid, sebacic acid, dimer acids, etc. Generally, the amount of dibasic acid or anhydride used will be 15 to 60 weight percent, based on the total weight of the resin-forming ingredients. Tribasic acid or anhydrides such as trimellitic anhydride may also be used.

Insofar as concerns the fatty modified polyester formulations of this invention, any of the usual monobasic fatty acids, fatty esters, and fatty oils from natural sources (i.e., animal, vegetable or marine) or the like from synthetic sources, containing aliphatic groups of 4 to 26 carbon atoms, can be used to modify the alkyd resins produced. Typical source examples include soya, linseed, safflower, tung, coconut, walnut, rape seed, perilla, sunflower, castor, cottonseed, tuna, sardine, menhaden, tall oil acids, etc. and which are substituted or unsubstituted or unsubstituted long chain fatty acids, esters or oils. In addition, alicyclic and aromatic monobasic acid modifiers having 4 to 26 carbon atoms may be used such as pelargonic acid, cyclohexane carboxylic acid, benzoic acid, para-tertiary butyl benzoic acid or rosin. Generally, the amount of fatty acid, ester or oil used will be 0 to 70 weight percent, based on the weight of resin-forming ingredients.

According to this invention, it has been discovered that the solution esterification process makes it possible to formulate and process without gelation, polyester resins which, if prepared by conventional solvent azeotrope or fusion process, would end in gels. The theory behind gelation is that a gelled resin contains a sizeable proportion of highly crosslinked molecules in addition to molecules of low and medium molecular weight. These highly crosslinked molecules are insoluble in solvents and are gelatinous in nature, thus trapping the more suitable molecules inside their structure. The solution esterification process of the present invention is believed to inhibit the formation of such highly crosslinked molecular arrangements by allowing a precise control of a number of cross links. Polyester resin formulations which are known to gel under prescribed conditions, i.e., when cooked sufficiently to reduce the acid number value to a certain level, can be cooked to much lower acid values by carrying out the polyester reaction in the solution esterification process of the present invention. The polyester resins so produced by the present invention have desirable viscosity-solids relationships and are generally characterized by exceptional flow characteristics, extremely fast cure, hard, flexible films, good adhesion, good chemical resistance, excellent durability, etc. Certain resins may be made with outstanding properties never before attainable with conventional polyester resins and, in every instance, improvement in one or more characteristics is noted. That it has been discovered that alkyd and polyester resin formulations which would result in gels or near gels, processed conventionally to a low acid number, give ungelled resins with improved optimum film forming and resultant film properties when prepared as herein described.

When, according to this invention, a polyester resin formulation is used which would gel under conventional processing, the inert solvent must be added before such gelation occurs. It makes little difference when the inert solvent is added as long as it is added before the resin is gelled. It is possible to cook the polyester resin formulation almost to the point of gelation, then add the solvent and promptly effect stoppage of gel formation. Such close-to gelation processing is not recommended because occasionally the gelation may occur before it can be halted. However, it is feasible, when care is used, to cook the resin almost to the point of gelation. The criterium is that if the solvent is not added soon enough or mixed in rapidly enough, the resin may continue to cook to an insoluble gel before the solvent has completely been cut into the resin and has had an opportunity to work its beneficient influence. Accordingly, it is desired to process the polyester resin formulations to a condition of about 5–20, preferably 5–10 points, above the acid value point at which gelation occurs when the same resin is processed conventionally (which point will generally be an acid value of 20–70, preferably 20–40), and then add the inert solvent. Then the resin solution is further processed to the desired non-gelled end point in the inert solvent, as described.

In a preferred aspect of this invention, the formulation used comprises 25–70% by weight of monobasic acid selected from the group consisting of aliphatic, acyclic and aromatic acids having 4–26 carbon atoms, and mixtures thereof, such as soya fatty acids, hydrogenated coconut fatty acids, and tall oil fatty acids, 15–60% by weight of dibasic acid selected from the group consisting of phthalic anhydride, isophthalic acid, terephthalic acid, maleic anhydride, fumaric acid, adipic acid, and succinic acid, and mixtures thereof, and 15–45% by weight polyhydric alcohol selected from the group consisting of trimethylol ethane, trimethylol propane, glycerol, pentaerythritol, sorbitol, ethylene glycol, propylene glycol, neopentyl glycol, hexanetriol, and butylene glycol, and mixtures thereof. Said percents by weight are based on the total weight of the resin-forming components in said formulation. Said polyhydric alcohol is used in an amount of at least 9% in excess of the stoichiometric amount necessary to react with all the carboxyl groups present in said formulation. Said formulation or a partially condensed alkyd thereof, is mixed or thinned with 30–70% by weight of liquid inert organic solvent, e.g., xylol, the latter percent by weight being based on the total weight of the thinned formulation. The thinned formulation is reacted as described above to produce a non-gelled resin solution which has an acid value of 3–15, preferably 3–10 (based on non-volatile resin solids), a viscosity of 10–40 stokes, preferably 15–35 stokes, at a non-volatile content of 40–70%, films of said resin solution being capable of air drying to a tack free state (using a 500 grams Zapon tack test) in a period of 5–20 min. and to a Sward Hardness of 10–48%, preferably 16–48%, in 1 hour.

It has been discovered that the process and formulation techniques are particularly applicable to alkyd resins intermolecularly modified with up to no more than about 70% by weight fatty acid component which may be derived from animal, vegetable, or marine and synthetic oils, esters and acids derived from such sources. This technique includes alkyd resins which are essentially not modified or oil-free and which are sometimes referred to as polyesters. The process is applicable to all alkyd and polyester resins intermolecularly modified with up to 95% fatty acid components, but no material improvement in film properties have been observed or determined from presently known testing methods when the resin is intermolecularly modified with over about 70% fatty acid components and further processed, as herein described.

*Apparatus.*—The apparatus shown in the drawing is illustrative of an application of the principles embodied for carrying out the process phases of the invention. Referring to the drawing, the apparatus includes a system which can be operated either as a closed or open system. It consists of an autoclave or reactor 10 containing a suitable agitator (not shown), connected through vapor conduit 11 to condenser 12, condensate return conduit 13, condensate and water trap 14 and solvent return pump 19 with associated solvent return conduits 15, 16, 17 and 18, and other fluid conduit and control elements as hereinafter described. The reactor is provided with a suitable charging inlet (not shown) and a discharge outlet controlled by valve 60.

The conduit 11 is provided with a flow control and shut-off valve 25 for aid in vapor flow control and for closing the conduit 11 when it is desirable to utilize the reactor 10 under the pressure of reaction. The condenser 12 is provided with outlet and vent valve 26 which permits operation of the condenser system at atmospheric pressure and permits the escape of non-condensable and harmful color inducing gases from the system.

The condensate return conduit 13 is provided with a sight glass 35 and flow control valve 35' for gravity feed of condensate from condenser 12 to trap 14. The conduit 13 is also provided with a by-pass conduit 28 and 29 with flow control valve 27. Conduit 29 is connected to an outlet conduit 58 which is controlled by valve 57 and may be utilized for taking the solvent from the system, as hereinafter described. The conduit 28 is connected near the base of trap 14 so that upon return of entrapped water in the solvent, it will more readily separate and settle-out in the bottom of the trap 14. Water collected in the trap 14 can be readily drained therefrom by means of conduit 30 upon proper operation of control valve 31, and as is determined by a suitable sight glass (not shown). The trap 14 is provided with solvent outlet conduit 15, for a flow of solvent to the reactor 10. The conduit 15 is connected by conduit 16 to reactor 10 and provides for gravity return flow of the solvent condensate upon opening of the valves 37 and 61. Otherwise, return flow against the pressure in the reactor 10 is provided by way of conduits 17 and 18 upon opening of valves 17', 18', and 36 and operation of a suitable pressure pump 19. When the pressure pump 19 is in operation, valve 37 is closed. An auxiliary valve connection 34 is provided as a means to add solvent to the reactor 10, when desired.

The trap 14 is also provided with a pressure equalizing conduit 40 connecting the top of trap 14 with the top of condenser 12, adjacent the gas outlet vent valve 26. Conduit 40 is adapted to be open or closed by valve 38.

To provide for correlating control of solvent escape and return to reactor 10, a by-pass 43 is arranged about valve 25. In by-pass 43, there is provided the auxiliary flow control valves 41 and 42 in combination with a pressure control valve 44. The pressure control valve 44 is regulated proportionally to solvent levels in trap 14 by means of float 46 controlling the fluid pressure in conduit 47 through operation of control valve 48 connected to a source of fluid pressure (not shown) through conduit 49. Such control valves are commercially available and therefore it is not deemed necessary to describe their details.

Further, the heating and cooling coil unit 32 in reactor 10, in combination with a temperature control 33, are of conventional manufacture and do not require a description of the details for an understanding of their operation other than the method of their utilization in preparing and treating the polyesters as herein described. An outlet 54, provided with control valve 55, is provided for removing samples from the reactor of converted polyester, as hereinafter described.

The examples given below will serve as illustrations of the invention but are not to be regarded as limitations thereon. Unless otherwise indicated, the components of the formulations are in parts by weight, acid values are based on non-volatile resin solids, viscosity values are those on the Gardner-Holdt scale, color values are those on the Gardner scale, and "conventional" processing, cooking or preparation, etc., means reacting alkyd ingredients under atmospheric reflux with less than 30 weight percent solvent present in the reaction mixture. The examples are illustrative of the use of the invention in preparing preferred products and especially of fast curing products by converging essentially high acid number, oil and acid modified polyesters and alkyds, to liquid coating solutions at liquid-solids levels and acid values at which the polymers would normally be irreversible and insoluble gels. The manner of initial preparation of high acid polyester and alkyd materials is well known to the art. However, to illustrate particularly, the short, medium and long oil and acid type compounds to which the preferred process is particularly applicable, the following will exemplify both the preparations thereof and the process technique therefor.

EXAMPLE I

The following short soya oil fatty acid alkyd resin formulation formed an irreversible and insoluble gel at 30–35 acid value when prepared by conventional means. The formulation was of the following components, by weight:

| | Parts |
|---|---|
| Soya fatty acid | 725 |
| Glycerol [1] | 332 |
| Pentaerythritol [1] | 196 |
| Phthalic anhydride | 932 |

[1] Total polyol (glycerol plus pentaerythritol) amounted to 9% in excess of the stoichiometric amount required to react with all of the carboxyl groups present in the formulation.

According to the present process, a non-gelled alkyd was initially prepared by conventionally cooking the same formulation given above to an acid value of between about 40–50 and then diluting the reaction mixture with 4000 parts (i.e., 65%) solvent (xylol) and charging the solvent-diluted mixture to the reactor 10. (The initial conventional cook could have been initially prepared in reactor 10 and the diluent added thereto).

After charging the reactor 10 with the above solvent-diluted mixture, the trap 14 was filled with xyol solvent to the level of solvent condensate outlet conduit 15. Cooling water was passed through a suitable heat exchanger (not shown) in condenser 12. Then, all the valves were closed except valve 25, the vent valves 26 and 38 and the valve 27. After adjusting the system, as indicated, heat was applied through the heating coils 32, by setting of the temperature control 33 to obtain the desired reaction condition of 450–480° F. The agitator (not shown) was started in the reaction chamber of reactor 10. At about 280° F. the solvent started to distill over from the reaction mixture and air was displaced from the system through open valve 26. Distillation of solvent was observed by its collection in sight glass 35. Only a few moments of distillation will purge air and other non-condensable gases from the reactor 10. The open vent valve 38 provides for free flow of condensate through conduit 13 and conduits 29 and 28, to trap 14, with valve 35', closed and valve 27 opened.

After purging, the reactor was sealed by closing valve 25. Heating of the reactor was continued until the desired reaction temperature of 450–480° F. was reached. At this temperature, the pressure in the reactor was about 110–125 p.s.i. Upon reaching the reaction temperature of about 460° F., the two valves 41 and 42 were opened, as were valves 27, 17', 18' and 36. The solvent distilling off from reactor 10 filled the trap 14 to a level about conduit 15 and flooded conduits 15 and 17. At this time, due to the raised liquid level in trap 14, valve 48 was actuated by float 46 to introduce and control fluid pressure and operate pressure control valve 44. Thus, valve 44 is automatically adjusted to establish system equilibrium between the high pressure created by reaction and solvent and then reduced to normal pressure in the condenser and trap portion of the system.

At this time, the pump 19 was started to draw the solvent condensate from trap 14 and force it back into the reactor 10 against the pressure created in the reactor. This condition of recycle continues to maintain the solvent at a relatively constant percentage level in the reactor. The solvent also serves as an azeotrope in carrying water to the trap 14. At suitable intervals, the water was drained from the trap 14 by means of drain outlet 30.

As the reaction progressed, samples were periodically removed from the reactor 10 and the acid values determined by conventional analysis. When the acid value fell below 3.5, on solution, the pressure pump 19 was stopped, valves 27 and 36 closed and valve 57 opened to allow the solvent distillate to drain off through conduit 58 into a suitable storage container (not shown). After about 2000 parts xylol solvent had been distilled over, to obtain about a 50% NV. (non-volatile) solution, valves 41 and 42 were closed and the temperature control unit 33 was set to provide for a flow of cooling fluid through the heat exchange coil 32. After cooling, the non-gelled product was drained via valve 60, filtered and ready for immediate use or drum and bulk storage.

Thus, the reflux conditions are exemplified for maintaining a relatively constant percentage of solvent within the range desired for converting an alkyd material of high acid number to a non-gelled lower acid number resin having improved physical characteristics. In making such conversion product, it will be recognized that by suitable operation of the illustrated pressure azeotrope reflux system, changes in reaction temperature can be accomplished that will produce resultant changes in pressure and in the time of reaction. The solvent may be added after our initial esterification, and formation of the resin then completed as described above with or without removal of non-condensable gases from the system. For preparation of coating vehicles, it is desirable to remove non-condensable gases from the resins so as to provide lighter colors.

The following example illustrates the preparation of the resin of Example I wherein the initial resin is made under solvent reflux conditions.

EXAMPLE II

The resin-forming components of the mixture of Example I were mixed with about 5% by weight of the solvent in reactor 10 and all the valves closed except 25, 27, 37, 38, 26 and 61. The temperature control regulator 33 was set to heat the reactor to 350–380° F. The trap 14 was also filled with solvent in the manner as heretofore described.

The components were cooked under solvent reflux conditions to an acid number of about 40–50. For this particular alkyd resin, an acid number of 40–50 is about 5–20 units above the acid number at which gelation normally occurs during conventional processing.

After the stated acid value was obtained, as determined by extracting and testing samples, the remaining 60% of the solvent was added with continued agitation to cut in the solvent. (Dependent upon the volatility of the solvent, the preferred method is to cool the initial resin preparation, to a temperature below the boiling point of the solvent, by adjustment of the heat control or circulation of a cooling fluid through the heat exchanger of reaction 10 before the dilution prior to the final treatment. The solvent may be introduced by a suitable auxiliary inlet to reactor 10 or otherwise utilizing the valve 34 and its corresponding conduit, as described.) The temperare control was then adjusted to control the reactor temperature at about 450-480° F., and the reaction of the solvent-diluted mixture was carried to completion, as heretofore described in Example I, to produce a non-gelled alkyd.

EXAMPLE III

In Examples I and II, according to this invention, the alkyd was initially prepared and then converted after addition of the solvent. In this Example III, the resin formulation constituents of Example I were charged to the reactor with the total solvent (4000 parts) and the entire reaction completed in one stage using the pressure azeotrope system described to produce a non-gelled alkyd. While this mode of processing is not preferred, it will avoid the multiple or two-stage operation of the preferred process. This one stage process requires about twice the reaction time even when run at higher temperatures. This time element, among other factors, makes this mode of procedure more costly and less desirable for practical plant operations.

The final physical properties of the finished alkyd resin solutions produced according to this invention in Examples I, II and III were analyzed as follows:

| | |
|---|---|
| I.V. | 50 |
| Viscosity, stokes | 15-25 |
| A.V. | 6-10 |
| Color | 5-8 |

The following will illustrate some advantages of the alkyd resin materials prepared by the process of this invention as described in Examples I, II and III. To 90 gram samples of each of the converted resin solutions at 50% N.V., there was added 10 grams xylol, 0.32 cc. of 6% cobalt naphthenate solution, 0.65 cc. of 24% lead naphthenate solution, and 0.47 cc. of 4% calcium naphthenate solution, to catalyze the drying of the films made from the resin solutions. Films of 0.0015 inch thickness were drawn down on glass. These films air dried to a tack free condition in 5 minutes, as measured by the 500 gram Zapon Test. In one hour, the Sward Hardness was 15% and in one day 32%. Further films of 0.0015 inch thickness were drawn down on glass and baked 15 minutes at 300° F. The Sward Hardness was 48%. By comparison, it was observed that the air dry time and Sward Hardness of these alkyd resins of Examples I, II and III are much improved as compared to the relatively slow drying and softer alkyds prepared as the starting materials of Examples I and II, but cooked almost to their gel point by conventional processing. The cured resin films show exceptionally good chemical solvent and mar resistance.

Previously, in order to obtain these film properties, it was considered necessary to modify initially prepared polyesters, or alkyds, with hard resins, phenolic resins, urea and amine resins, nitrocellulose lacquers, vinyl resins, or by further polymerizing them with reactive vinyl monomeric compounds and the like. Further, it is also known that such modified resins do not usually have good solvent and mar resistance.

As a further illustration of the benefits obtained by solvent processing of alkyd resin formulations, the following examples are given.

EXAMPLE IV

An alkyd resin was prepared according to the following formulation:

| | Parts |
|---|---|
| Soya fatty acids | 415.5 |
| Ethylene glycol [1] | 93.4 |
| Pentaerythritol [1] | 166.8 |
| Phthalic anhydride | 376.8 |

[1] Total polyol used in this formulation amounted to 20% in excess of the stoichiometric amount.

All ingredients were charged to the reaction vessel and esterified at 400-430° F. with 5% xylol reflux in the manner described in Example II for the initial preparation of the alkyd. The physical properties of the resulting non-gelled resin solution were:

| | |
|---|---|
| Percent, N.V. | 60 |
| Viscosity | T-V |
| A.V. | 6-10 |
| Color, max. | 7 |

This product is acceptable as a slow drying commercial product.

EXAMPLE IV-A

The resin solution produced in Example IV was diluted to 60% non-voltaile with xylol solvent, the solution heated to about 280° F. and the reactor system purged of non-condensable gases as described in Example I. After purging, the mixture was heated to about 400-450° F., with the reactor sealed, and held for about one hour, with no apparent change in acid number taking place. The action of heat, agitation and solution combined to give a new non-gelled resin solution with the following physical properties as compared to the original physical properties:

| | |
|---|---|
| Percent N.V. | 60 |
| Viscosity | M-P |
| A.V. | 6-10 |
| Color, max. | 7 |

The only apparent change was a reduction in viscosity without gelation. However, upon preparation of coating compositions, of conventional formulation, with this treated resin, the flow and leveling properties were superior to the coating compositions prepared from Example IV and showed a superior drying property, as indicated in Table I below.

EXAMPLE V

In this example, a non-gelled alkyd was prepared by this invention, which alkyd if prepared by conventional processing would gel at an acid value of above 10. The formulation was as follows:

| | Parts |
|---|---|
| Soya fatty acids | 422.3 |
| Ethylene glycol [1] | 70.5 |
| Pentaerythritol [1] | 198.1 |
| Phthalic anhydride | 382.4 |

[1] Total polyol used in this formulation amounted to 20% in excess of the stoichiometric amount.

This alkyd was prepared according to conventional cooking procedure until the acid value was in the range of 15-20 and then thinned to 40% non-voltaile with xylol and processed under pressure to an acid values below 10 according to the procedure described in Example I. The physical properties of the resultant non-gelled resin vehicle were as follows:

| | |
|---|---|
| Percent, N.V. | 60 |
| Viscosity | U-W |
| Color, max. | 7 |
| A.V. | 6-10 |

EXAMPLE VI

Another alkyd resin composition was prepared from ingredients as follows:

| | Parts |
|---|---|
| Soya fatty acids | 420.9 |
| Ethylene glycol [1] | 52.6 |
| Pentaerythritol [1] | 206.4 |
| Phthalic anhydride | 387.5 |

[1] Total polyol used in this formulation was 15% in excess of the stoichiometric amount.

The first stage of preparing this alkyd was by a conventional procedure and was halted, short of gelation, at an acid value of 40.

If processed further by conventional cook to a low acid number most suitable for use in a paint or varnish vehicle, this resin would gel at an acid number of about 20 to 25. However, when this prepared non-gelled alkyd was cut to 50% non-volatile with xylol solvent and charged to the reactor for treatment by the pressure-azeotropic conversion process described in Example I, the physical properties of the finished fluid non-gelled product were:

| | |
|---|---|
| Percent, N.V. | 60 |
| Viscosity | X+½ |
| Color | 6 |
| A.V. | 10 |

A performance table showing comparison of the above described products of Examples IV and IV-A and the unconverted and converted products of Examples V and VI is shown as follows:

TABLE I

| Resin | Air dry time [1] | Air dry Sward Hardness, Percent | | Sward Hardness of Baked Film, Percent [2] |
|---|---|---|---|---|
| | | 1 day | 1 week | |
| IV | 6 hrs | 8 | 12 | 10 |
| IV-A | 4¾ hrs | 8 | 14 | 10 |
| V unconverted | 4 hrs | 12 | 18 | ([3]) |
| V converted | 10-15 min | 14 | 20 | 16 |
| VI unconverted | 3 hrs | 14 | 22 | ([3]) |
| VI converted | 5-8 min | 18 | 28 | 20 |

[1] Time for 1.5 mil wet film (containing 0.04% Co, 0.4% Pb, 1% anti-skinning agent), drawndown on glass plate, to pass 500 gm. Zapon Test.
[2] 1.5 wet mil films of a mixture of 85% of the alkyd and 15% butylated melamine formaldehyde resin were baked 30 min. at 200° F.
[3] The unconverted resins of Examples V and VI are unstable in the presence of amine resins due to the high A.V. of these resins.

Additional examples of resins and the improvemnts provided by the additional treatment, as embodied herein, are illustrated by the following example.

EXAMPLE VII

A resin solution was prepared from the following formulation:

| | Parts |
|---|---|
| Soya fatty acids | 562 |
| Hydrogenated, distilled coconut fatty acids | 156 |
| Glycerol [1] | 340 |
| Pentaerythritol [1] | 196 |
| Phthalic anhydride | 932 |
| Total | 2,196 |
| Less water of esterification | 163 |
| Total | 2,033 |

[1] Total polyol used in this formulation amounted to 9% in excess of the stoichiometric amount.

This resin was prepared by initially cooking to a relatively high acid number in a conventional manner as follows: all the ingredients plus 10% xylol solvent (200 parts) were charged into the reactor and cooked (esterified) under solvent azeotropic reflux at about 350–400° F. to an acid value of about 35–50. (Another attempt to cook this formulation to less than 35 acid value resulted in a gel.) To the so-prepared initial resin was added 3000 parts of xylol and the mixture was cooked under pressure-azeotropic reflux at about 460–500° F. as described in Example I until an acid value of 6–10 was obtained. Excess xylol was stripped off by flashing until a solid resin content of 50% was obtained.

The physical properties of the resultant finished non-gelled resin solution were as follows:

| | |
|---|---|
| N.V. percent | 50 |
| Viscosity, stokes | 10–15 |
| Color | 6 |
| Acid value | 6–10 |

Metallic driers were added to this resin solution as described above. The following results were obtained for 0.0015 inch thick wet film drawdowns on glass and allowed to air dry at normal room temperature:

| | |
|---|---|
| 500 gm. Zapon tack free time min | 5 |
| 1 hour Sward Hardness percent | 12 |
| 1 day Sward Hardness do | 20 |
| 1 week Sward Hardness do | 24 |

This represents the use of a substantial proportion of a saturated fatty acid in polyester formulations with an accomplishment of drying properties that cannot be obtained with similar resins cooked by present practice in the industry.

EXAMPLE VIII

The following resin formulation was charged and esterified at about 350–400° F. with 10% xylol as an azeotropic reflux solvent:

| | Parts |
|---|---|
| Soya fatty acids | 239 |
| Trimethylol ethane [1] | 208.5 |
| Pentaerythritol [1] | 91.6 |
| Phthalic anhydride | 435.8 |
| Total | 1,074.9 |
| Less water of esterification | 74.9 |
| Total | 1,000.0 |

[1] Total polyol used in this formulation amounted to 9% in excess of the stoichiometric amount.

When the acid value reached 35–50, which is just above the value at which gelation would ordinarily occur under conventional processing, there was added 1400 additional parts of xylol and the processing continued under pressure azeotropic reflux as described in Examples I and II, at about 460–500° F. until an acid value of 6–10 was reached. The excess xylol was removed by flashing, until the percent N.V. reached 50%. The physical properties of the non-gelled resin solution were:

| | |
|---|---|
| Percent, N.V. | 50 |
| Viscosity, stokes | 10–12 |
| A.V. | 6–10 |
| Color | 6 |

Metallic driers were added to a sample of the resultant resin solution as described above and 0.0015 inch thick wet films were drawn down on glass and air dried. The 500 gm. Zapon tack free time was 4 minutes; the 1 hr. Sward Hardness was 15%; and the 1 day Sward Hardness was 32%.

EXAMPLE IX

A part of the resin solution from Example VIII was pigmented as follows:

The following were charged to pebble mill and ground for 20 hours:

| | Parts |
|---|---|
| Rutile TiO$_2$ | 250 |
| Resin (Example VIII) | 50 |
| Xylol | 60 |
| Mono-butyl ether of ethylene glycol | 15 |
| 24% lead naphthenate | 2.3 |

The resulting pebble mill paste was let down with:

| | Parts |
|---|---|
| Resin (Example VIII) | 506 |
| Xylol | 26 |
| ASA (conventional anti-skinning agent) | 0.55 |
| 24% lead naphthenate | 2.3 |
| 6% cobalt naphthenate | 1.85 |
| 4% calcium naphthenate | 2.8 |

This gas a white enamel containing 47.5% pigment by weight. Films 0.0015 inch thick were drawn down on ass and a 500 gm. Zapon tack free time of 5 minutes as obtained. The 1 hr. Sward Hardness was 14%, the hr. Sward was 16%, and the 24 hr. Sward was 32%. he film was very glossy, tough and chemical resistant fter 24 hours. For purposes of this formulation and test, e ASA may be left out. The application and use of ell known anti-skinning agents is known throughout e trade; among other useful agents are those described  National Aniline Division Bulletin 20758 and U.S. atent 2,306,016.

EXAMPLE X

Another part of the resin solution from Example VIII as pigmented as follows to give a green enamel:
The following were charged to a pebble mill and round for 20 hours:

| | Parts |
|---|---|
| utile TiO$_2$ | 180 |
| hthalocyanine green | 20 |
| .esin (Example VIII) | 100 |
| ylol | 76 |
| Iono-butyl ether of ethylene glycol | 15 |

This pebble mill paste was let down with:

| | Parts |
|---|---|
| :esin (Example VIII) | 834 |
| 4% lead naphthenate | 7.8 |
| % cobalt naphthenate | 3.1 |
| \SA | 0.93 | ilms on glass, 0.0015 inch thick, air dried to 500 gm. apon tack free in 5 minutes, had 1 hr. Sward Hardness f 12% and an 18 hr. Sward Hardness of 26%. The lms were glossy, tough and chemical resistant after 24 ours.

EXAMPLE XI

In this example, a resin was made as in Example V xcept that during the pressure azeotropic reflux stage, /M & P naphtha was used in place of xylol and the ressure obtained was 120–135 p.s.i. The percent N.V. luring processing was 45%. No solvent was stripped off lfter processing. The final non-gelled resin solution prop- rties were:

| | |
|---|---|
| Percent, N.V. | 45 |
| Viscosity, stokes | 35–45 |
| A.V. | 6–10 |
| Color | 6 |

EXAMPLE XII

In this example, a resin was made as in Example V xcept that mineral spirits was used as the solvent instead f xylol and the pressure obtained was 60–80 p.s.i. The percent N.V. during processing was 45%. No solvent was stripped off after processing. The final properties were:

| | |
|---|---|
| Percent, N.V. | 45 |
| Viscosity, stokes | 40–55 |
| A.V. | 6–10 |
| Color | 6 |

EXAMPLE XIII

In this example, a number of runs were made as in Example V except that the percent N.V. during the pressure azeotropic reflux stage was as indicated in the following Table II. Also listed in the Table II is the initial acid value before the pressure-azeotropic esterification in dilute solution was begun. Table II represents a study of the effects of conditions present at the end of an initial polyester preparation and the conditions present during the pressure heating stage upon the final viscosity.

TABLE II

| Run No. | Percent N.V. during run | A.V. Initially | Final Visc. 60% N.V. in xylol, stokes | Final A.V. |
|---|---|---|---|---|
| 1 | 70 | 34.2 | 31.9 | 7.8 |
| 2 | 70 | 17.5 | 39.3 | 7.5 |
| 3 | 65 | 14.1 | 35.8 | 7.2 |
| 4 | 60 | 29.5 | 26.6 | 7.9 |
| 5 | 55 | 34.2 | 17.0 | 8.3 |
| 6 | 50 | 21.9 | 10.1 | 7.6 |
| 7 | 50 | 14.1 | 20.0 | 6.8 |
| 8 | 50 | 34.2 | 7.6 | 8.1 |
| 9 | 40 | 29.5 | 8.5 | 8.2 |
| 10 | 40 | 14.1 | 8.8 | 6.8 |

It will be noted that the higher the percent N.V. during processing, the higher the final viscosity becomes. It will also be noted that the same percent N.V., higher initial acid values yield resins with lower final viscosity, but the effect of initial acid value in this respect is much less than that of percent N.V. During processing, as the solids content is lowered, the effect of the initial acid values on the final viscosity is reduced.

EXAMPLE XIV

In this example, the following components were subjected to alcoholysis in a conventional process:

| | Parts |
|---|---|
| Alkali refined soybean oil | 980 |
| Pentaerythritol | 110 |
| Litharge | 0.34 |

The alcoholysis product was made by adding these components to the reactor 10, heating to about 450° F. under an inert gas blanket and holding until alcoholysis was complete as demonstrated by a clear solution with 2 parts methyl alcohol to one part alcoholysis product. The alcoholysis product was cooled to 300° F. and the following mixture made up:

| | Parts |
|---|---|
| Alcoholysis product [1] | 1,090 |
| Glycerol [1] | 155 |
| Isophthalic acid | 580 |
| Maleic anhydride | 2 |
| Total | 1,827 |
| Less water of esterification | 126 |
| Total | 1,701 |

[1] The total polyol used in this formulation was 13% in excess of the stoichiometric amount.

This mixture was esterfied at 430° F. with 10 mineral spirits as a reflux solvent (as in Example II) to an acid value of about 20–30 which is slightly above the gel point. The resin was thinned with mineral spirits to 40% N.V. and esterified under pressure azeotropic reflux conditions at about 460–500° F. (as in Example I) to acid value of 6–10. The mineral spirits were flashed off to a percent N.V. of 50%. The final properties of the non-gelled resin obtained were:

| | |
|---|---|
| Percent, N.V. | 50 |
| Viscosity, stokes | 3.7 |
| Color | 7 |
| A.V. | 6–10 |

Metallic naphthenate driers were added to the resin solution at the level of 0.4% lead and 0.04% cobalt. Films 1.5 mil thick air dried to 500 gm. Zapon tack free in 40 minutes and were tack free to aluminum foil in less than 3 hours. The Sward Hardness after 1 day was 10%. The medium oil length formulation and solvent combination would otherwise not normally be considered a suitable coating vehicle and composition if prepared by a conventional cook.

EXAMPLE XV

The following ingredients were charged to reactor 10 and conventionally cooked:

| | Parts |
|---|---|
| Alkali refined soybean oil | 937.5 |
| Pentaerythritol | 182.8 |
| Litharge | 0.33 |

The mixture was heated to about 450° F. to effect alcoholysis, as demonstrated by 2:1 solubility in methyl alcohol, and cooled to 400° F. The following mixture was made up:

| | Parts |
|---|---|
| Alcoholysis product [1] | 1,120.3 |
| Isophthalic acid | 359.5 |
| Triphenyl phosphite | 3.0 |
| Total | 1,482.8 |
| Less water of esterification | 77.8 |
| Total | 1,405.0 |

[1] Total polyol used in this formulation was 13% in excess of the stoichiometric amount.

The mixture was then esterified as in Example II under 10% mineral spirits reflux at about 450–460° F. to an A.V. of about 13–16. This is a formulation wherein if the acid value were reduced by conventional processing, the resin would gel at an acid value somewhere under 10. The same formulation can be cooked to an acid value of about 10 without gelation by a conventional alkyd process, but its viscosity is considerably higher and provides an inferior coating. According to this invention, the initial resin was diluted to 50% N.V. with mineral spirits and converted as in Example I under pressure azeotropic reflux conditions at about 460–500° F. to an A.V. of 6–10. The mineral spirits were flashed off to 70% N.V. The final non-gelled resin solution properties were:

| | |
|---|---|
| Percent, N.V. | 70 |
| Viscosity, stokes | 20–30 |
| A.V. | 6–10 |
| Color | 7 |

Using 0.4% lead and 0.04% cobalt naphthenates as driers, films of this resin solution were dried to 500 gm. Zapon tack free in 3–4 hours and had a 1 day Sward Hardness of 10%. Without this processing treatment as described, the composition is very slow drying and softer for a considerably longer period of time; in addition, the viscosity would be much higher and compatibility with other resins would not be generally satisfactory.

EXAMPLE XVI

The following ingredients were charged to reactor 10:

| | Parts |
|---|---|
| Fractionated tall oil fatty acids | 896.0 |
| Glycerol [1] | 97.6 |
| Pentaerythritol [1] | 182.8 |
| Isophthalic acid | 359.5 |
| Total | 1,535.9 |
| Less water of esterification | 135.3 |
| Total | 1,400.6 |

[1] Total polyol used in this formulation was 15% in excess of the stoichiometric amount.

The mixture was initially esterified under 10% mineral spirits reflux, as illustrated in Example II, at about 450–460° F. to an A.V. of about 14–18. This was closely similar to the composition of Example XV except that the gel point under conventional processing is slightly higher. The initial alkyd was diluted to 50% N.V. with mineral spirits and esterified and converted under the pressure-azeotropic reflux process described at about 460–500° F. to an A.V. of 6–10. The mineral spirits were flashed off to 70% N.V. The final non-gelled resin solution properties are as follows:

| | |
|---|---|
| Percent, N.V. | 70 |
| Viscosity, stokes | 25–40 |
| A.V. | 6–10 |
| Color | 8 |

Using 24% lead naphthenate solution and 6% cobalt naphthenate solution as driers, at 0.4% Pb and 0.04% Co levels, respectively, 1.5 mil films of this resin solution air dried to 500 gm. Zapon tack free in 3–4 hours and had a 1 day Sward Hardness of 8%. Similarly prepared film of an alkyd prepared by conventional processing of the same resin formulation requires several hours longer to dry and naturally cannot obtain the Sward Hardness in this period of time.

EXAMPLE XVII

The non-gelled resin solution prepared in Example XVI was pigmented by first mixing the following:

| | Parts |
|---|---|
| Rutile TiO$_2$ | 150 |
| Resin (Example XVI) | 76 |
| 4% calcium naphthenate | 2 |

This paste was ground 2 passes on a 3 roller mill and let down with:

| | Parts |
|---|---|
| Resin (Example XVI) | 204 |
| Mineral spirits | 69 |
| 6% cobalt naphthenate | 1 |
| ASA | 0.5 |

(Other conventional resin pigments may be used in these resins as exemplified, and in the ways recognizable to the protective coating art.) An 8+ grind was obtained with a viscosity of 70 KU. Films drawn down on glass air dried to 500 gm. Zapon tack free in 13 hours with a 60° gloss of 95%. This resin formulation if conventionally processed results in enamels which remain soft and tacky over a much longer period with a relatively indefinite drying time and less gloss. As known to those skilled in the art, conventional enamels made from resin of this type generally require about 24 hours to air dry tack free.

EXAMPLE XVIII

This example illustrates the preparation of an alkyd which is a non-oxidizing resin designed for use in baking enamels with amine-formaldehyde resins as curing agents. The formulation used is as follows:

| | Parts |
|---|---|
| Hydrogenated, distilled coconut fatty acids | 296 |
| Trimethylolethane [1] | 369 |
| Phthalic anhydride | 441 |
| Maleic anhydride | 2.5 |
| Triphenyl phosphate | 2.0 |

[1] Total polyol used in this formulation was 12% in excess of the stoichiometric amount.

The formulation was esterified under 10% xylol reflux, as described in Example II, to an A.V. near the gel point and about 20–30, diluted to 45% N.V. with xylol and esterified and converted under the pressure azeotropic reflux, as described, at about 460–500° F. to an A.V. of 6–10. The xylol was flashed off to 60% N.V. The physical properties of the resulting non-gelled resin solution are:

| | |
|---|---|
| Percent, N.V. | 60 |
| Viscosity, stokes | 25–45 |
| A.V. | 6–10 |
| Color | 3 |

The product was modified by adding 26% of a butylated melamine formaldehyde resin and the resultant product ked as 3 mil films for 20 minutes at 240° F. and gave
the following film properties:

| | |
|---|---|
| ...ot Hardness | B. |
| ...ard Hardness | 38%. |
| ...E. Impact Test | Pass 60% elongation. |

EXAMPLE XIX

An alkyd was prepared from the following formulation:

| | Parts |
|---|---|
| ...largonic acid | 427.5 |
| ...imethylol ethane[1] | 737 |
| ...thalic anhydride | 792 |
| ...phthalic acid | 99.6 |
| ...aleic anhydride | 4.5 |
| ...iphenyl phosphate | 3.8 |

[1] Total polyol used in this formulation was 26% in excess the stoichiometric amount.

...e formulation was esterified under 10% xylol reflux, ...described in Example II, to an A.V. near the gel point ...d about 25–30, diluted to 45% N.V. with xylol, and ...rther esterified under the pressure azeotropic reflux, as ...scribed, at about 460–500° F. to an A.V. of about 6–10. ...e xylol was stripped off to 60% N.V. The physical ...operties of the resulting non-gelled resin solution were:

| | |
|---|---|
| ...rcent, N.V. | 60 |
| ...iscosity, stokes | 25–45 |
| ...V. | 6–10 |
| ...lor | 3 |

...e resin solution was modified by adding 26% of a ...itylated melamine formaldehyde resin and the resultant ...oduct baked at 3 mil films for 20 minutes at 240° F. and ...tained the following film properties:

| | |
|---|---|
| ...ot Hardness | 3H. |
| ...ard Hardness | 48. |
| ...E. Impact Test | Pass 60% elongation. |

The foregoing examples illustrate methods of this invention for processing polyester and alkyd resins in a ...actical and efficient manner. In the processing, the ...sins, embodied in the examples, are preferably initially ...ocessed down to the point of acid value above where ...lation normally occurs under conventional processing ...d then are given the further treatment described to ob...in non-gelled polyester resins, and particularly alkyds ...d chemically modified alkyds as improved coating ...hicles, as described.

These examples illustrate the polyester resins contain...ig substituted and unsubstituted aliphatic chains of 4–26 ...rbon atoms that have been prepared by the solution ...terification process embodied herein. It has been dis...vered that not only can many new resin formulations ... successfully cooked to a low acid number without gela...on, but new solvent soluble non-gelled polyester resins ...lutions with many new and unusual properties can be ...repared by using this invention to complete the final ...rocessing of prefabricated polyesters and alkyds or pre...aring non-gelled solutions of such active resin forming ...omponents in a unitary phase.

It would further unduly burden this disclosure to ...umerate the many and varied specific polyester and ...lkyd compositions embodied herein.

The system provides for pressure in the reactor and ...tmospheric or low pressure in the condenser and trap ...ecanter with close control of the reflux rate and return ...f solvent to the reactor. Thus, the danger of use of ...flammable coating solvents under pressure in the con...enser portion of the system is avoided. This also is a ...ature of the invention in the method of preparing the ...nproved resins, as described.

From the above description, it will be recognized that ...onventional alkyd and like alkyd polyester formulations ...repared by using the solution esterification technique of the present invention results in improved coating and vehicle compositions which are lower in viscosity and have improved curing speeds, or are otherwise more suitable coating and laminating vehicles, as compared to the same formulations prepared by conventional alkyd cooks. The practical application of this process is preferably to provide, from unbalanced alkyd formulations, which gel under conventional alkyd cooking technique, new non-gelled alkyd resin vehicle and coating compositions of low acid values and improved coating compositions. It has been discovered that modified alkyds which, if prepared by conventional cooks result in unusable gel or near gel composition at relatively high acid values, may be processed, as herein described, to acid values which are below the said acid values at which these alkyds would gel, and by so doing there is provided improved alkyds, alkyd resin vehicles and alkyd resin coating compositions with improved flow and coating properties and cure speeds, compatibility, durability, mar resistance and chemical resistances. For example, it has been discovered that coatings provided by this processing to not require the usual simonize and waxing finish to improve the finish. In addition, the resins have unusual compatibility with other resins and solvents or diluents. These polyesters and alkyds are especially compatible with vinyls, nitrocellulose, amines, urea chlorinated hydrocarbons, some hydrocarbon resins, many phenolic resins, and short, medium and long oil alkyds. The resin solutions prepared in Examples XVIII and XIX are particularly useful as nitrocellulose plasticizers up to levels of 20 to 40%.

According to the present invention, it is believed that more uniform molecular size alkyd polymers are obtained if the polymerization is carried out in solvent, as described. If alkyd polymers are polymerized in the complete or substantial absence of solvent, molecular weight range of polymer size if obtained varying from very low (which are believed to be of around 2000 mol. wt. or thereabouts) to very high molecular weight (which are believed to be of around 10,000 mol. wt. or thereabouts). If the same polymerization is carried out according to the present invention, in solution, and maintained in a large excess of solvents, i.e., in a minimum amount of at least about 500% to about 3000% over that required for azeotropic reflux at atmospheric pressure, the molecular weight range is more narrow with most of the very low molecular weight polymers and very high molecular weight polymers eliminated or at least so reduced in amount as to be unobjectionable. Thus, the alkyd polymers of the present invention, even at subsequently reduced and at coating solvent levels, have better flow characteristics, are lower in viscosity, and they have improved solubility and compatibility properties as well as many other desirable characteristics as compared to other alkyds of the same formulation prepared by conventional processing techniques.

It is apparent that many modifications and variations of the foregoing improvements in alkyd resins as coating and laminating vehicles and their method of production as hereinbefore set forth may be made without departing from the spirit and scope thereof. The specific embodiments described are given by way of example only and the improvements provided are limited only by the terms of the appended claims.

We claim:

1. The process of preparing a solvent soluble ungelled polyester resin coating vehicle by the steps comprising (1) mixing a solvent soluble polyester formulation of resin components comprising about 0–70% monobasic organic acid of 4–26 carbon atoms per molecule, 15–60% polybasic organic acid, and 10–45% polyhydric alcohol, by weight of the said polyester components, the total amount of said polyhydric alcohol used in said formulation being at least 9% in excess of the stoichiometric amount necessary to react with all of the carboxyl groups present in said formulation, (2) diluting the resulting mixture with an inert liquid solvent in an amount of substantially 30–70% by weight of the total diluted reaction mixture, (3) agitating and heating the diluted reaction mixture to an esterification reaction temperature under internally generated pressure, simultaneously removing the water of reaction and maintaining said amount of said solvent in the heated reaction mixture during said esterification reaction, (4) effecting a reduction of the acid value of said reaction mixture under the said reaction temperature and pressure conditions to an acid value below which an insoluble gel would be formed if said resin formulation were prepared under atmospheric reflux in the presence of substantially below 30% of said inert solvent, (5) cooling the resulting reaction mixture, and recovering as the product of the process a coating vehicle of the polyester resin in a dilutable non-gelled fluid state miscible in said solvent and having said low acid value.

2. A product obtained by the process of claim 1.

3. In the process of claim 1, wherein the monobasic acid is present in an amount of about 25% to about 70% by weight of the polyester components and is selected from the group consisting of aliphatic, alicyclic, and aromatic acid compounds containing 4–26 carbon atoms, and mixtures of the same.

4. In the method of preparing a solvent soluble alkyd resin coating vehicle, the steps comprising (1) initially preparing a solvent soluble non-gelled alkyd resin in the presence of substantially below 30% of inert solvent, using a total amount of polyhydric alcohol at least 9% in excess of the stoichiometric amount necessary to react with all the carboxyl groups present in the alkyd formulation, (2) mixing said initially prepared alkyd resin with an inert solvent thinner to provide a solution containing from 30% to 70% inert solvent thinner by total weight, (3) heating the said solvent-thinned alkyd resin to an esterification reaction temperature under internally generated pressure conditions, (4) simultaneously effecting removal of water of reaction and maintaining said 30% to 70% amount of said inert solvent thinner in the heated mixture, (5) effecting a reduction of the acid value of the reaction mixture with retention of solubility and fluidity of the resulting alkyd in said solvent-thinned mixture until the acid value of the said alkyd is below the acid value at which gelation would occur when prepared with the solvent content in an amount substantially below 30%, (6) and recovering a non-gelled fluid alkyd resin solution as a readily dilutable coating vehicle miscible in said inert solvent thinner with the said resin having said low acid value.

5. A product obtained by the process of claim 4.

6. The method of claim 4, wherein the alkyd resin is modified with a monobasic acid component selected from the group consisting of aliphatic, alicyclic and aromatic acid compounds containing 4–26 carbon atoms, and mixtures of the same.

7. The method of claim 4, wherein the esterification reaction temperature under internally generated pressure is in the range of 300° F. to 500° F.

8. The method of preparing an improved alkyd resin coating vehicle in fluid non-gelled form, comprising the steps of (1) mixing the components of said alkyd resin comprising 0–70% of a monobasic organic acid modifier, 15–60% polybasic organic acid selected from the group consisting of polycarboxylic acids, polycarboxylic acid anhydrides, and mixtures thereof, and 10–45% of polyhydric alcohol component, the total amount of polyhydric alcohol used being at least 9% in excess of the stoichiometric amount necessary to react with all the carboxyl groups present in the alkyd formulation, (2) initially heating and reacting the resulting mixture at atmospheric pressure, and in the presence of substantially below 30% of inert solvent to a desired acid value above that acid value at which the resin forms an insoluble gel, (3) thinning said alkyd resin with an inert solvent which will dissolve the so-formed alkyd resin and which will not react therewith during further esterification and interesterification, the amount of said solvent being 30% to 70% of the total diluted reaction mixtures by weight, (4) heating the resulting diluted reaction mixture in a reaction zone under esterification and transesterification temperature and pressure conditions, (5) removing a vapor mixture containing said solvent and water of esterification from said reaction zone, (6) condensing said vapor mixture and separating said solvent from said water of esterification, (7) returning said solvent to the reaction mixture at a rate to substantially maintain a constant amount of solvent of 30% to 70% by weight in said reaction mixture, (8) continuing said heating and solvent return until the acid value of said alkyd resin is below the acid value at which said alkyd resin forms an insoluble gel when the acid value thereof is so reduced in the presence of an amount of such solvent less than said 30%, (9) and recovering as the product the resulting non-gelled alkyd resin miscible in said solvent.

9. The method of claim 8, wherein the alkyd resin is modified with a monobasic acid component selected from the group consisting of aliphatic, alicyclic and aromatic acid compounds containing 4–26 carbon atoms, and mixtures of the same.

10. The method of preparing a non-gelled solvent-dilutable liquid alkyd resin solution, comprising the steps of (1) mixing an inert solvent with a solvent-miscible monobasic acid modified alkyd resin formulation of polycarboxylic acid selected from the group consisting of polycarboxylic acids, polycarboxylic acid anhydrides, and mixtures thereof, and polyhydric alcohol to produce a solution containing 30% to 70% solvent by total weight of the diluted reaction mixture, the total amount of polyhydric alcohol used being at least 9% in excess of the stoichiometric amount necessary to react with all the carboxyl groups present in said formulation, (2) heating the said diluted reaction mixture in a reaction zone to esterification reaction conditions of temperature and internally generated pressure to effect an azeotropic reflux of said solvent and water of esterification, (3) condensing the resulting vapors and separating water of reaction therein from said solvent, (4) returning condensed solvent to the said alkyd resin solution in said reaction zone to maintain a relatively constant solvent amount of at least about 30% solvent by weight in the reaction mixture, (5) continuing said heating with further esterification until the acid value of the alkyd resin has been reduced to an acid value below the point at which it would gel if prepared under atmospheric reflux in the presence of substantially below said 30% of solvent, and (6) recovering as the product of the process the alkyd resin in a fluid-dilutable condition miscible in the said inert solvent solution.

11. An improved fast drying coating vehicle which is a solution of an oxidizing alkyd resin in a solvent thinnable non-gelled state, said resin having an acid value below that at which it normally forms an insoluble gel, comprising (1) about 25–70% by weight of a monobasic acid portion selected from the class consisting of aliphatic, alicyclic and aromatic acids having 4–26 carbon atoms, and mixtures of the same, (2) about 15% to about 60% by weight of a dibasic acid portion selected from the group consisting of phthalic anhydride, isophthalic acid, terephthalic acid, maleic anhydride, fumaric acid, adipic acid and succinic acid, and mixtures of the same, (3) about 15% to about 45% by weight of a polyhydric alcohol portion selected from the group consisting of trimethylol ethane, trimethylol propane, glycerol, pentaerythritol, sorbitol, ethylene glycol, propylene glycol, neopentyl glycol, hexanetriol and butylene glycol, and mixtures of the same, the said resin having an acid value of about 3 to 15, said solution having a viscosity of about 10–40 stokes at a non-volatile content of 40% to 70%, films of said solution being capable of air dryg to a tack free state, using a 500 gram Zapon tack it, in a period of about 5 to about 20 minutes and to a Sward Hardness of about 10 to about 48 in 1 hour.

12. The process of preparing a solvent soluble solution of non-gelled alkyd resin, which comprises the steps (1) mixing an alkyd resin formulation comprising 5–70% monobasic fatty acid component having 4–26 carbon atoms, 15–60% dibasic acid component, and 15–70% polyhydric alcohol component (said percents being percents by weight based on the total weight of said components, and said polyhydric alcohol being used in an amount at least 9% in excess of the stoichiometric amount necessary to react with all the carboxyl groups in said formulation), (2) diluting said formulation with an amount of inert liquid organic solvent which is less than 30% by weight of the resulting solvent diluted formulation, (3) initially heating said diluted formulation under conditions of atmospheric pressure and azeotropic reflux until the acid value of the resulting partially condensed alkyd resin is 5–20 points above the normal acid value of 20–70 at which said formulation when heated under said conditions would form a gel, (4) thinning the resulting solution of said partially condensed alkyd resin with inert liquid organic solvent to provide a solution containing 30–70% by weight of said solvent, (5) heating said thinned solution in a closed reaction zone under conditions of internally generated pressure and azeotropic reflux while withdrawing from said reaction zone a vapor mixture comprising solvent and water, condensing said vapor mixture, separating solvent from the resulting condensate, and returning the resulting separated solvent to said reaction zone to maintain said 30–70% solvent level, (6) continuing said latter step (5) of heating to produce a solution comprising a non-gelled alkyd resin having an acid value of 3–15, and (7) recovering from said reaction zone the latter non-gelled solution as the product of the process.

13. The process of claim 12, wherein said fatty acid is selected from the group consisting of soya fatty acids, hydrogenated coconut acids, and tall oil fatty acids, and mixtures thereof, said dibasic acid is selected from the group consisting of phthalic anhydride, isophthalic acid, terephthalic acid, maleic acid, fumaric acid, adipic acid, succinic acid, and mixtures thereof, said polyhydric alcohol is selected from the group consisting of trimethylol ethane, trimethylol propane, glycerol, pentaerythritol, sorbitol, ethylene glycol, propylene glycol, neopentyl glycol, hexanetriol, and butylene glycol, and mixtures thereof, and said solvent is xylene.

14. The process according to claim 13 wherein said initial heating of said step (3) of said diluted formulation is carried out until the acid value of the resulting partially condensed alkyd resin is 5–10 points above the normal acid value of 20–40, and said level of solvent is maintained at a constant value in the range of 40–65% by weight of said thinned solution.

15. The product obtained by the process of claim 14.

References Cited

UNITED STATES PATENTS

| | | | |
|---|---|---|---|
| 2,057,766 | 10/1936 | Brubaker | 260—75 |
| 2,734,876 | 2/1956 | Bradley | 260—75 |
| 2,823,197 | 2/1958 | Morris et al. | 260—75 |
| 2,840,538 | 6/1958 | Minter et al. | 260—75 |
| 2,856,374 | 10/1958 | Bolton | 260—22 |
| 2,860,119 | 11/1958 | Petropoulos et al. | 260—75 |

DONALD E. CZAJA, *Primary Examiner.*

LEON J. BERCOVITZ, *Examiner.*

R. W. GRIFFIN, *Assistant Examiner.*

UNITED STATES PATENT OFFICE
CERTIFICATE OF CORRECTION

Patent No. 3,325,428                                    June 13, 1967

Richard B. Graver et al.

It is hereby certified that error appears in the above numbered patent requiring correction and that the said Letters Patent should read as corrected below.

Column 4, line 31, for "for" read -- of --; column 5, line 12, for "boiling" read -- boiling point --; column 7, line 10, for "gelatin" read -- gelation --; column 9, line 50, for "xyol" read -- xylol --; column 12, lines 13 and 50, for "voltaile", each occurrence, read -- volatile --; line 51, for "values" read -- value --; column 13, line 36, for "improvemnts" read -- improvements --; column 14, line 21, for "239" read -- 339 --; line 74, for "gas" read -- gave --; column 16, line 52, for "esterfied" read -- esterified --; same line 52, for "10" read -- 10% --; column 22, line 3, for "sail" read -- said --.

(SEAL)          Signed and sealed this 18th day of June 1968.
Attest:

Edward M. Fletcher, Jr.                               EDWARD J. BRENNER
Attesting Officer                                          Commissioner of Patents